(12) United States Patent
Nam

(10) Patent No.: US 9,909,476 B2
(45) Date of Patent: *Mar. 6, 2018

(54) METHOD AND SYSTEM FOR CONTROLLING EXHAUST GAS FLOW IN ENGINE SYSTEM

(71) Applicant: Hyundai Motor Company, Seoul (KR)

(72) Inventor: Kihoon Nam, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/702,674

(22) Filed: May 2, 2015

(65) Prior Publication Data
US 2016/0108788 A1    Apr. 21, 2016

(30) Foreign Application Priority Data

Oct. 20, 2014  (KR) .................. 10-2014-0142072

(51) Int. Cl.
*F01N 3/20* (2006.01)
*F01N 3/021* (2006.01)
*F02M 26/05* (2016.01)
*F02M 26/23* (2016.01)

(52) U.S. Cl.
CPC ........... *F01N 3/2053* (2013.01); *F01N 3/021* (2013.01); *F01N 2410/00* (2013.01); *F01N 2900/08* (2013.01); *F01N 2900/1404* (2013.01); *F02M 26/05* (2016.02); *F02M 26/23* (2016.02); *Y02T 10/20* (2013.01)

(58) Field of Classification Search
CPC ...... F01N 3/0878; F01N 3/031; F01N 3/2053; F01N 3/021; F01N 2410/00; F01N 2900/08; F01N 2900/1404; F02M 26/05; F02M 26/23; Y02T 10/20

See application file for complete search history.

(56) References Cited

U.S. PATENT DOCUMENTS

| | | | | |
|---|---|---|---|---|
| 4,962,643 | A  * | 10/1990 | Panten | .................... F01N 3/023 60/288 |
| 6,931,836 | B2 * | 8/2005 | Steinert | ............... F02D 41/1475 123/305 |
| 8,828,342 | B1 * | 9/2014 | Tyo | ........................ F01N 3/2053 423/213.2 |

(Continued)

FOREIGN PATENT DOCUMENTS

| JP | 2001-115828 A | 4/2001 |
|---|---|---|
| JP | 2011-214546 A | 10/2011 |

(Continued)

OTHER PUBLICATIONS

Machine Translation of JP 2011214546 A.*

*Primary Examiner* — Brandon Lee
(74) *Attorney, Agent, or Firm* — Mintz Levin Cohn Ferris Glovsky and Popeo, P.C.; Peter F. Corless

(57) ABSTRACT

A method and system for controlling an exhaust gas flow in an engine system are provided. The method includes detecting operating conditions of an engine and operating a valve that is disposed on a line bypassing a catalyst unit based on the operating conditions such that exhaust gas bypasses the catalyst unit. The operating conditions include a vehicle speed, an engine rotation speed, a fuel injection amount, an accelerator pedal signal, a coolant temperature, or a lambda value of exhaust gas.

8 Claims, 4 Drawing Sheets

(56) References Cited

U.S. PATENT DOCUMENTS

| | | | |
|---|---|---|---|
| 2001/0001361 A1* | 5/2001 | Itou | F02D 41/0255 60/286 |
| 2004/0055285 A1* | 3/2004 | Rohr | B01D 53/9495 60/295 |
| 2006/0000200 A1* | 1/2006 | Pott | F02D 41/0295 60/285 |
| 2007/0272480 A1* | 11/2007 | Kuroda | B01D 53/9454 181/254 |
| 2008/0127640 A1* | 6/2008 | Morita | F01N 3/0814 60/301 |
| 2008/0210208 A1* | 9/2008 | Tateno | F02D 31/002 123/689 |
| 2012/0304887 A1* | 12/2012 | Gokhale | B61C 5/04 105/62.1 |

FOREIGN PATENT DOCUMENTS

| | | | |
|---|---|---|---|
| JP | 2011214546 A | * | 10/2011 |
| KR | 10-2003-0086358 A | | 11/2003 |
| KR | 10-2008-0054818 A | | 6/2008 |

* cited by examiner

METHOD AND SYSTEM FOR CONTROLLING EXHAUST GAS FLOW IN ENGINE SYSTEM

CROSS-REFERENCE TO RELATED APPLICATION

This application claims priority to and the benefit of Korean Patent Application No. 10-2014-0142072 filed in the Korean Intellectual Property Office on Oct. 20, 2014, the entire contents of which are incorporated herein by reference.

BACKGROUND (a) Field of the Invention

The present invention is related to a method and system for controlling an exhaust gas flow in an engine system that safely maintains a temperature of a diesel particulate filter (DPF) or a diesel oxidation catalyst (DOC) in an over-run condition of an engine to uniformly maintain a purification rate of exhaust gas.

(b) Description of the Related Art

Generally, a diesel oxidation catalyst (DOC) and a diesel particulate filter (DPF), a nitrogen oxide purifying unit (LNT, lean NOx trap), and a selective catalytic reduction unit (SCR) have been considered in diesel engines of vehicle to cope with the exhaust gas regulations. The post processing system such as DOC, LNT, and SCR which are provided to reduce harmful material of exhaust gas are to be operated in a basic temperature area (e.g., without over heating) for chemical reaction.

Specifically, exhaust gas temperature is substantially low in a cold state of an engine (e.g., coolant temperature is less than 90 degrees Celsius), and excessive harmful material of exhaust gas is generated until the post processing device is activated. Accordingly, fuel is further used to increase the exhaust gas temperature to reduce the harmful material of the exhaust gas in a cold state of the engine. However, it may be possible to increase the exhaust gas temperature through fuel combustion, an intake air may be transferred to a post processing system without combustion in an over-run condition (e.g., coasting state, fuel unburned state), and therefore the post processing system may be cooled by the unburned intake air and the activation time of the post processing system may be delayed.

The above information disclosed in this section is merely for enhancement of understanding of the background of the invention and therefore it may contain information that does not form the prior art that is already known in this country to a person of ordinary skill in the art.

SUMMARY

The present invention has been made in an effort to provide a method for controlling an exhaust gas flow in an engine system having advantages of maintaining exhaust gas purification rate and exhaust gas quality by preventing the temperature decrement of the catalyst unit when uncombusted exhaust gas passes a catalyst unit.

A method and system for controlling an exhaust gas flow in an engine system according to an exemplary embodiment of the present invention may include detecting operating conditions of an engine, and operating a valve disposed on a line bypassing a catalyst unit based on the operating conditions such that exhaust gas bypasses the catalyst unit.

The operating conditions may include a vehicle speed, an engine rotation speed, a fuel injection amount, an accelerator pedal signal, a coolant temperature, or a lambda value of exhaust gas. The exhaust gas may be controlled to pass the catalyst unit regardless of the operating conditions, when the coolant temperature is greater than a predetermined value. The exhaust gas may be controlled to bypass the catalyst unit based on the operating conditions, when the coolant temperature is less than a predetermined value.

Further, the exhaust gas may be controlled to pass the catalyst unit, when the engine is on an idle condition and may be controlled to pass the catalyst unit, when the engine is in an acceleration state. The exhaust gas may be controlled to bypass the catalyst unit, when the engine is in an idle state and a lambda value is greater than a predetermined value. Additionally, the exhaust gas may be controlled to pass the catalyst unit, when the engine is in an over-run state and a lambda value is less than a predetermined value. The catalyst unit may include an oxidation catalyst (DOC) or a particulate filter (DPF).

In accordance with the present invention for realizing the object, the uncombusted exhaust gas may be controlled to bypass the catalyst unit to uniformly maintain the catalyst unit temperature and the quality of exhaust gas may be improved, when the engine is in an over-run condition, the coolant temperature is less than a predetermined value, and a lambda value is greater than a predetermined value.

BRIEF DESCRIPTION OF THE DRAWINGS

The accompanying drawings, which are included to provide a further understanding of the invention, illustrate exemplary embodiments of the invention, but exemplary embodiments of the present invention should not be construed as limited to the accompanying drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

An exemplary embodiment of the present invention will hereinafter be described in detail with reference to the accompanying drawings.

Figure 1:
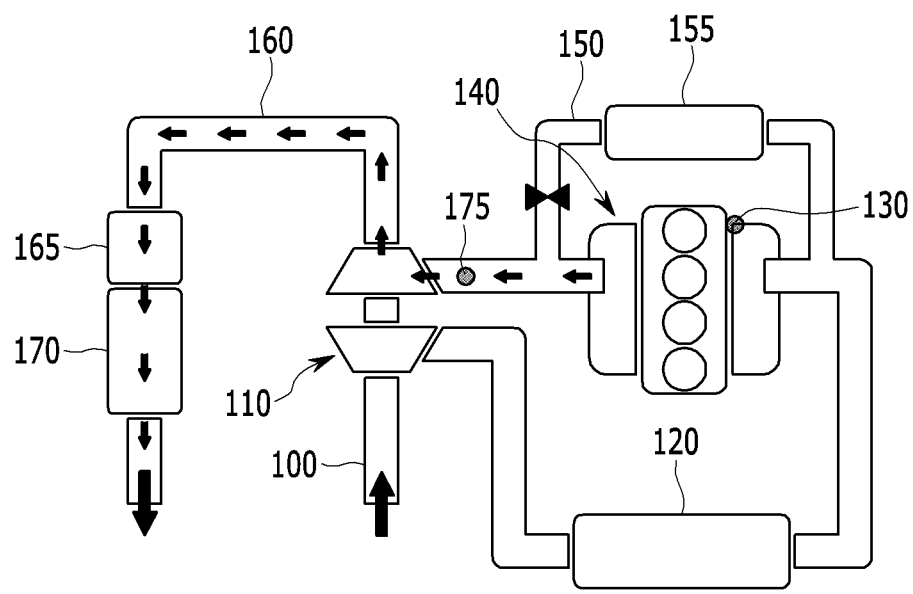
FIG. 1 is an exemplary schematic diagram of an engine system according to the related art.

FIG. 1 is an exemplary schematic diagram of an engine system according to the related art. Referring to FIG. 1, an engine system includes an intake line 100, a turbocharger 110, an intercooler 120, an engine 140, a cooling coolant temperature sensor 130, an exhaust line 160, a diesel oxidation catalyst 165, a diesel particulate filter 170, a high pressure EGR line 150, and a high pressure EGR cooler 155. Exterior air is supplied through the intake line 100, the turbocharger 110 uses exhaust gas flowing in the exhaust line 160 to rotate a turbine, the turbine compresses air flowing in the intake line, and the compressed air is supplied to a combustion chamber of the engine 140.

The intercooler 120 is configured to cool the air flowing in the intake line 100, and the high pressure EGR line 150 recirculates exhaust gas to the intake line 100, the exhaust gas is exhausted from the combustion chamber of the engine 140. A high pressure EGR valve and a high pressure EGR cooler 155 are disposed on the high pressure EGR line 150 to adjust the temperature and the flow rate of the EGR gas.

Further, a catalyst unit is disposed at a downstream side of the turbocharger 110 of the exhaust line 160, and the catalyst unit includes a diesel oxidation catalyst (165, DOC) and a diesel particulate filter (170, DPF). The diesel oxidation catalyst 165 decreases harmful materials included in the exhaust gas, and the diesel particulate filter 170 filters and eliminates particulate matters included the exhaust gas. The lambda sensor 175 is disposed at an upstream side of the turbocharger 110 of the exhaust line 160, detects oxygen concentration of the exhaust gas exhausted from the combustion chamber, and outputs lean/rich condition signal of the exhaust gas, and the coolant temperature sensor 130 is disposed near the engine 140 and is configured to detect coolant temperature signal circulating the engine 140.

In an exemplary embodiment of the present invention, the engine 140 does not inject fuel at an over-run condition, and the engine 140 is rotated by a torque transferred from a drive shaft. For example, when an accelerator pedal is released, an injector does not inject fuel, and an engine is rotated at a speed greater than an idle rotation speed of an engine. Accordingly, exterior air is suctioned through the intake line 100 to the engine 140, uncombustion low temperature air is exhausted through the exhaust line 160, and thus the temperature of the diesel oxidation catalyst 165 and the diesel particulate filter 170 may be rapidly decreased and the purification efficiency of thereof may be deteriorated by the temperature decrement.

Figure 2:
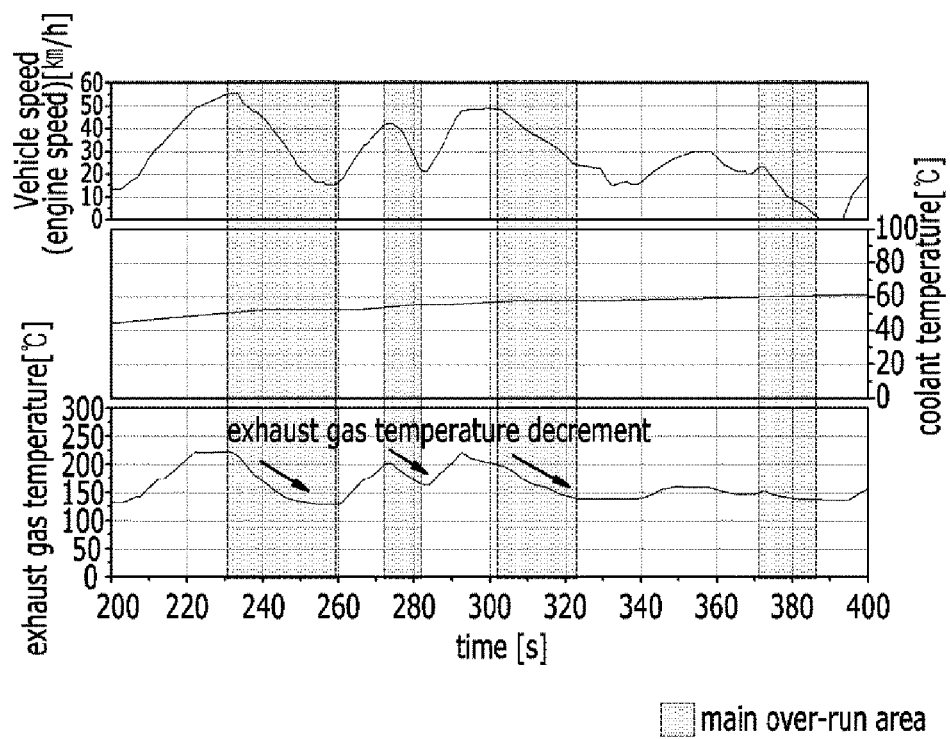
FIG. 2 is an exemplary graph showing an over-run section of an engine system according to the related art.

FIG. 2 is an exemplary graph showing an over-run section of an engine system according to the related art. Referring to FIG. 2, a horizontal axis denotes time, and a vertical axis denotes an exhaust temperature and a vehicle speed. Since fuel is not injected at an over-run condition, a vehicle speed may be decreased, exhaust gas temperature may be decreased, and purification efficiency of the diesel oxidation catalyst 165 and the diesel particulate filter 170 may deteriorate.

Figure 3:
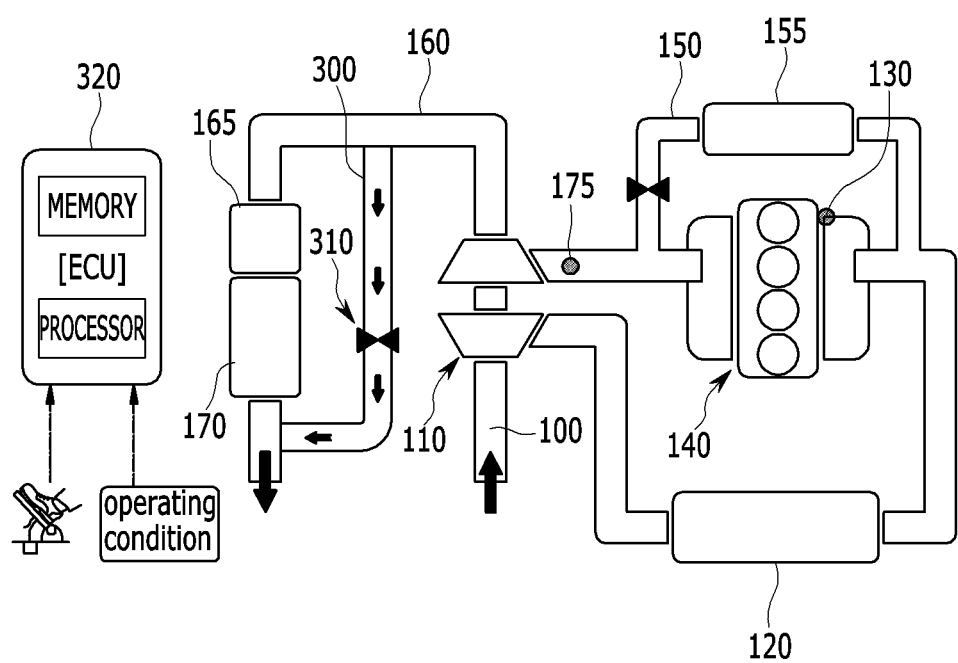
FIG. 3 is an exemplary schematic diagram of an engine system according to an exemplary embodiment of the present invention.

FIG. 3 is an exemplary schematic diagram of an engine system according to an exemplary embodiment of the present invention. Referring to FIG. 3, an engine system may include an intake line 100, a turbocharger 110, an intercooler 120, an engine 140, a coolant temperature sensor 130, an exhaust line 160, a diesel oxidation catalyst 165, a diesel particulate filter 170, a high pressure EGR line 150, a high pressure EGR cooler 155, a lambda sensor 175, a bypass line 300, a bypass valve 310, and a controller 320.

In particular, exterior air may be supplied through the intake line 100, a turbine of the turbocharger 110 may be rotated by exhaust gas flowing in the exhaust line 160, and a compressor may be configured to compress the exterior air flowing in the intake line to supply the air to a combustion chamber of the engine 140. The intercooler 120 may be configured to cool the air flowing in the intake line 100, the high pressure EGR line 150 may be configured to recirculate the exhaust gas exhausted from the combustion chamber of the engine 140 to the intake line 100. A higher pressure EGR valve and a high pressure EGR cooler 155 may be disposed on the high pressure EGR line 150 to adjust the flow rate and the temperature of the recirculated exhaust gas.

A catalyst unit may be disposed at a downstream side of the turbocharger 110 on the exhaust line 160, and the catalyst unit may include a diesel oxidation catalyst (165, DOC) and a diesel particulate filter (170, DPF). The diesel oxidation catalyst 165 may be configured to reduce harmful materials included in the exhaust gas, such as HC, CO, and NOx, and the diesel particulate filter 170 may be configured to filter particulate matters included in the exhaust gas and eliminates them. The lambda sensor 175 may be disposed on an upstream side of the turbocharger 110 of the exhaust line 160 and may be configured to detect oxygen concentration of the exhaust gas of the combustion chamber of the engine 140, output a lean/rich condition signal of the exhaust gas, and the coolant temperature sensor 130 may be disposed near (e.g., adjacent to) the engine 140 to detect temperature signal of the coolant circulating the engine 140.

In an exemplary embodiment of the present invention, a bypass line 300 may be formed on the exhaust line 160 to bypass the diesel oxidation catalyst 165 and the diesel particulate filter 170, and the bypass valve 310 may be disposed on the bypass line 300 to open or close the bypass line 300. Further, a lambda sensor 175 may be disposed at an upstream side of the turbine of the turbocharger 110 on the exhaust line 160. The lambda sensor 175 may be configured to detect oxygen of exhaust gas flowing in the exhaust line 160, used to detect a lean condition and a rich condition of the exhaust gas, and output a lambda value as a signal. Oxygen concentration of the exhaust gas is detected by the lambda value that is outputted from the lambda sensor 175.

The controller 320 may be configured to receive the lambda value and the coolant temperature signal from the lambda sensor 175 and the coolant temperature sensor 130 and detect oxygen concentration of the exhaust gas and warming up condition of the engine. Further, the controller 320 may be configured to detect a vehicle speed, an engine rotation speed, load (e.g., fuel injection amount), an accelerator pedal signal, a coolant temperature, and a lambda value and determine an overall driving condition of the engine 140.

In an exemplary embodiment of the present invention, the engine 140 does not inject fuel on an over-run condition and may be rotated by a torque transferred from a drive shaft. For example, when an accelerator pedal is released, an injector (not shown) does not inject fuel, and the engine 140 may be rotated at a speed greater than an idle rotation speed.

Accordingly, exterior air may flow through the intake line 100 to the engine 140, uncombusted low temperature air may flow through the exhaust line 160, in a condition that the engine is not fully warmed up, the temperature of the diesel oxidation catalyst 165 and the diesel particulate filter 170 may be rapidly decreased, and the purification efficiency of the diesel oxidation catalyst 165 and the diesel particulate filter 170 may deteriorate.

In an exemplary embodiment of the present invention, when the engine is in an over-run condition, the coolant temperature may be less than a predetermined value, and the lambda value may be greater than a predetermined value (e.g., a lean condition that fuel concentration is low), the bypass valve 310 may be opened and the exhaust gas flowing in the exhaust line 160 may be controlled to bypass the diesel oxidation catalyst 165 and the diesel particulate filter 170 and may flow through the bypass line 300.

Accordingly, when the engine 140 is operated in an over-run condition, the coolant temperature may be less than a predetermined value, and the lambda value may be greater than a predetermined value (e.g., oxygen concentration is high), the temperature decrement of the diesel oxidation catalyst 165 and the diesel particulate filter 170 may be prevented to maintain the purification thereof.

Figure 4:
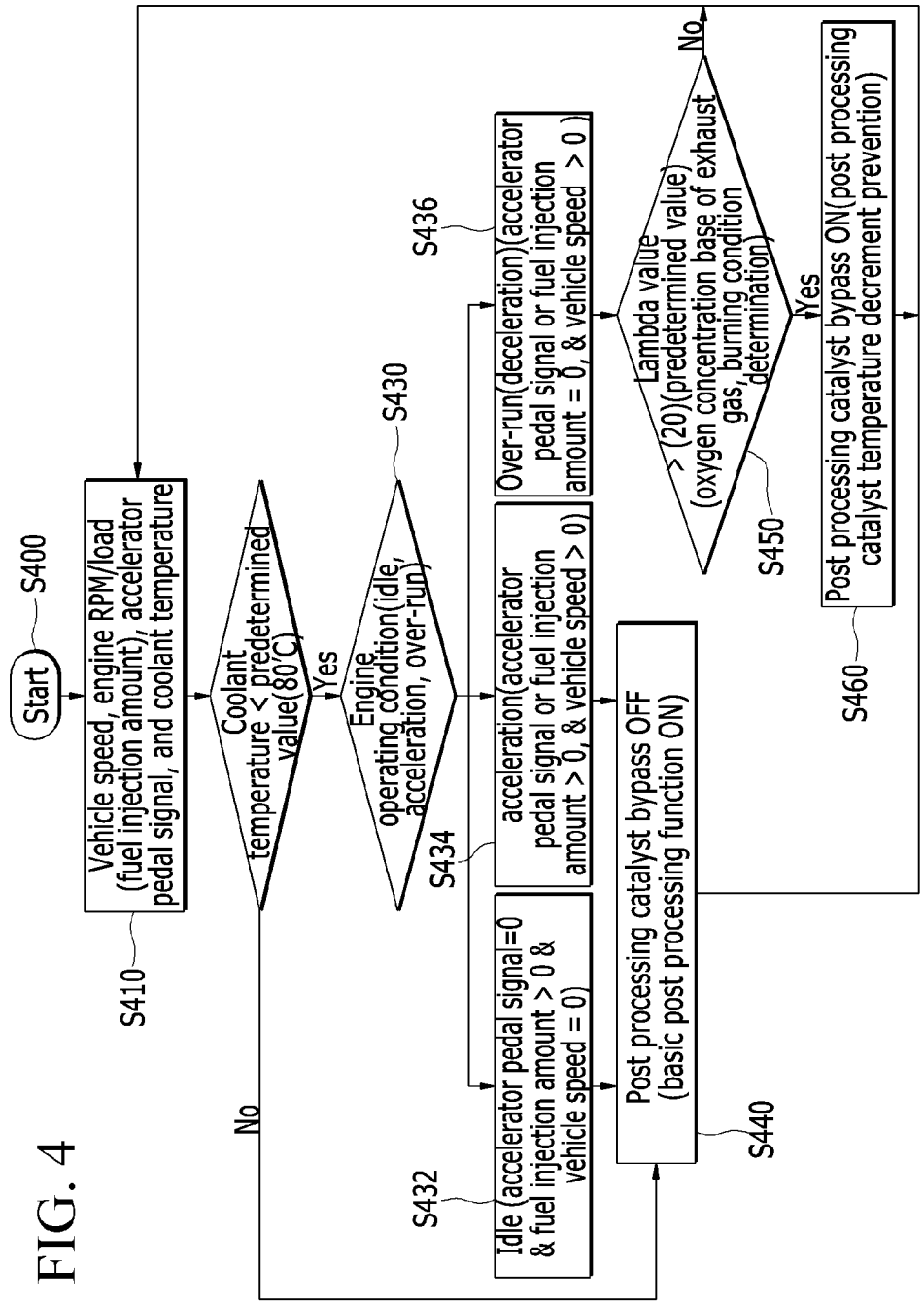
FIG. 4 is an exemplary flowchart showing a method for controlling an exhaust gas flow in an engine system according to an exemplary embodiment of the present invention.

FIG. 4 is an exemplary flowchart showing a method for controlling an exhaust gas flow in an engine system according to an exemplary embodiment of the present invention. Referring to FIG. 4, a control may be started in S400, and driving conditions may be detected in S410. The driving condition may include a vehicle speed, a rotation speed of an engine, a load (e.g., fuel injection amount), an accelerator pedal position (signal), or a coolant temperature.

Additionally, whether a coolant temperature of the engine is less than a predetermined value may be determined (e.g., less than about 80 degrees Celsius) in S420 using a coolant temperature sensor 130. In response to determining that the coolant temperature is less than a predetermined value in S420, S430 may be performed, and in response to determining that the coolant temperature is greater than a predetermined value, S440 may be performed. In S430, the controller 320 may be configured to determine a driving condition of a vehicle based on input data. The driving condition may include an idle condition, an acceleration condition, and an over-run condition.

The idle condition may be when an accelerator pedal signal is 0, and fuel injection amount is greater than 0 (e.g., idle injection amount). The acceleration condition may be when an accelerator pedal signal is greater than 0, fuel injection amount is greater than 0, and a vehicle speed is greater than 0. In addition, the over-run condition may be when an accelerator pedal signal is 0, fuel injection amount is 0, and a vehicle speed is greater than 0, wherein the engine is operated in a speed greater than an idle speed. In response to determining that a vehicle is being driven in an idle condition in S432, the controller 320 may be configured to close the bypass valve 310 in S440 to cause the exhaust gas flowing in the exhaust line 160 to flow through the diesel oxidation catalyst 165 and the diesel particulate filter 170.

In response to determining that a vehicle is an acceleration condition in S434, the controller 320 may be configured to close the bypass valve 310 in S440 to cause the exhaust gas flowing in the exhaust line 160 to flow through the diesel oxidation catalyst 165 and the diesel particulate filter 170. Further, in response to determining that the vehicle is on an over-run condition in S436, whether a lambda value detected by the lambda sensor 175 is greater than a predetermined value (e.g., about 20) may be determined, and when the lambda value is greater than the predetermined value, the controller 320 may be configured to open the bypass valve 310 in S460 to cause the exhaust gas flowing in the exhaust line 160 to bypass the diesel oxidation catalyst 165 and the diesel particulate filter 170.

In addition, in response to determining that the lambda value is less than the predetermined value in S450, S410 may be performed in an exemplary embodiment of the present invention. An oxygen concentration of exhaust gas may be calculated using a lambda value in S450, and the exhaust gas condition may be determined using the oxygen concentration on an over-run condition.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

DESCRIPTION OF SYMBOLS

100: intake line
110: turbo charger
120: intercooler
130: coolant temperature sensor
140: engine
150: high pressure EGR line
155: high pressure EGR cooler
160: exhaust line
165: diesel oxidation catalyst
170: diesel particulate filter
175: lambda sensor
300: bypass line
310: bypass valve
320: controller

What is claimed is:

1. A method for controlling an exhaust gas flow in an engine system, comprising:
   detecting, by a controller, operating conditions of an engine;
   operating, by the controller, a valve disposed on a line that bypasses a catalyst unit based on the operating conditions such that the exhaust gas bypasses the catalyst unit, wherein the operating conditions are selected from any one of the group consisting of: a vehicle speed, an engine rotation speed, a fuel injection amount, an accelerator pedal signal, a coolant temperature, and a lambda value of exhaust gas;

in response to determining that the coolant temperature is greater than a predetermined value, closing, by the controller, the valve to cause the exhaust gas to pass through the catalyst unit;

in response to determining that the coolant temperature is less than the predetermined value when the engine is on an idle condition or in an acceleration state, closing, by the controller, the valve to cause the exhaust gas to pass through the catalyst unit; and in response to determining that the coolant temperature is less than the predetermined value when the engine is on an over-run state, opening, by the controller, the valve to cause the exhaust gas to bypass the catalyst unit.

2. The method for controlling an exhaust gas flow of claim 1, wherein the catalyst unit includes an oxidation catalyst (DOC) or a particulate filter (DPF).

3. The method for controlling an exhaust gas flow of claim 1, further comprising:
opening, by the controller, the valve when the engine is in the idle condition and the lambda value is greater than a predetermined value to cause the exhaust gas to bypass the catalyst unit.

4. The method for controlling an exhaust gas flow of claim 1, further comprising:
closing, by the controller, the valve when the engine is in the over-run state and the lambda value is less than a predetermined value to cause the exhaust gas to pass through the catalyst unit.

5. A system for controlling an exhaust gas flow in an engine system, comprising:
a memory configured to store program instructions; and
a processor configured to execute the program instructions, the program instructions when executed configured to:
detect operating conditions of an engine;
operate a valve disposed on a line that bypasses a catalyst unit based on the operating conditions such that the exhaust gas bypasses the catalyst unit, wherein the operating conditions are selected from any one of the group consisting of: a vehicle speed, an engine rotation speed, a fuel injection amount, an accelerator pedal signal, a coolant temperature, and a lambda value of exhaust gas;
close the valve in response to determining that the coolant temperature is greater than a predetermined value to cause the exhaust gas to pass through the catalyst unit;
close the valve in response to determining that the coolant temperature is less than the predetermined value when the engine is on an idle condition or in an acceleration state to cause the exhaust gas to pass through the catalyst unit; and
open the valve in response to determining that the coolant temperature is less than the predetermined value when the engine is on an over-run state to cause the exhaust gas to bypass the catalyst unit.

6. The system for controlling an exhaust gas flow rate of claim 5, wherein the catalyst unit includes an oxidation catalyst (DOC) or a particulate filter (DPF).

7. The system for controlling an exhaust gas flow of claim 5, wherein the program instructions when executed are further configured to open the valve when the engine is in the idle condition and the lambda value is greater than a predetermined value to cause the exhaust gas to bypass the catalyst unit.

8. The system for controlling an exhaust gas flow of claim 5, wherein the program instructions when executed are further configured to close the valve when the engine is in the over-run state and the lambda value is less than a predetermined value to cause the exhaust gas to pass the catalyst unit.

* * * * *